Feb. 24, 1959

C. R. HETTRICK 2,874,511

LINE CONNECTOR FOR FISHING APPLIANCES

Filed May 13, 1957

INVENTOR.
Carl R. Hettrick
BY
Murray, Sackhoff & Murray
ATT'YS 2,874,511

LINE CONNECTOR FOR FISHING APPLIANCES

Carl R. Hettrick, Terrace Park, Ohio

Application May 13, 1957, Serial No. 658,799

3 Claims. (Cl. 43—44.87)

The present invention relates to improvements in line connecting devices and is particularly directed to a novel line connector that has been found practical for use in connecting a fishing float to a fishing line.

The main object of this invention is to provide a connector that will firmly secure a float, or the like, to a line without the necessity of tying, knotting, looping or interlacing the line itself.

Another object of the invention is to provide a line connector that may be readily incorporated in a fishing float, or the like, and thereafter manipulated to engage the line and the float or permit free movement of the line through the float, as required.

A further object of the invention is to provide a line connector which is in the form of a flexible line receiving tube or sleeve that is anchored at its ends in a float, or the like, the tube being susceptible of being held in the float in a set twisted condition such that its convolutions will grip and hold the line relative to the float.

The invention consists in the construction and arrangements of parts hereinafter fully described, illustrated in the accompanying drawings and set forth in the appended claims, it being understood that the connector may be utilized for securing a line to other objects and that various changes in form or minor details of construction may be resorted to without departing from the principle or the advantage of this invention.

Figure 1:
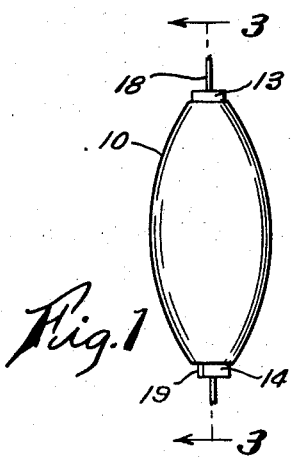
Fig. 1 is a side elevational view of a fishing float with my line connector incorporated therein.
Figure 2:
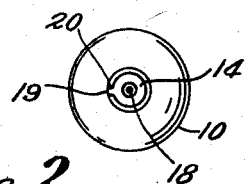
Fig. 2 is an end elevation of the float shown in Fig. 1.
Figure 3:
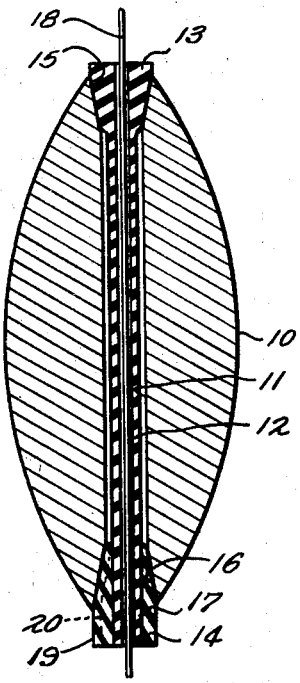
Fig. 3 is an enlarged section on line 3—3 of Fig. 1 showing the connector in one operative condition.

Referring to the drawings wherein like numerals indicate like parts my invention is illustrated as applied to an element which takes the form of a fishing float 10 of any configuration and material. The element has a suitable axial bore 11 formed therethrough for freely receiving a thin walled tube 12 constructed of resilient material such as rubber, or the like, said tube having enlarged ends 13 and 14 that form plug means for securing the tube in the float 10 against axial displacement. Preferably the enlarged ends 13 and 14 are tapered inwardly and are disposed in countersunk seats 15 and 16, respectively, formed in the float body at the outer ends of the bore 11. As best shown in Fig. 3 it is now thought the better practice to form the enlarged end 13 integral with the tube 12 whilst the opposed end 14 is separately formed and provided with a hole 17 into which the free end of the tube is inserted and cemented therein.

Figure 4:
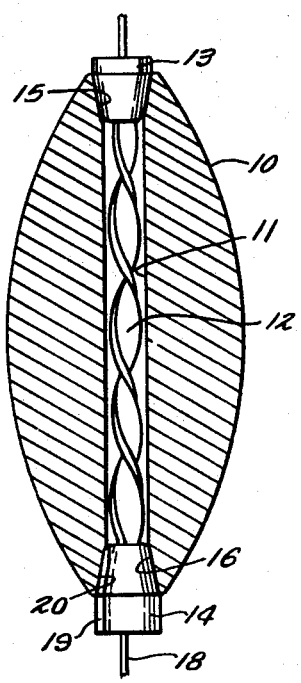
Fig. 4 is a view similar to Fig. 3 showing the connector in operative line gripping condition.

A line such as a fishing line 18 passes through the tube 12 and as shown in Fig. 3 the line may freely move through the tube when said tube is in the straight position illustrated therein to permit use of the float for the type of fishing known as variable depth fishing. When it is desired to positively connect the float to the line it is only necessary to manipulate the ends of the tube 12 to twist the tube into the operative position shown in Fig. 4 wherein the relatively tight convolutions 19 formed in the tube will effectively grip the line and hold the float at a selected place along the fishing line. At present the means for deforming and then holding the tube in deformed condition is thought to consist of securing the end 13 of tube to its seat 15 either by cement or force driving the end into the seat whilst the opposed end 14 may extend somewhat beyond the body of the float 10 where it can be grasped, pulled outwardly from the seat and then manually rotated until the tube is twisted sufficiently to hold the line 18. Thereafter the end 14 is returned to its seat 16 and may be held therein against rotation either by forcing it axially into the seat or by a small fin 19 formed on the outer surface of said end that registers with a groove 20 formed in the surface of the seat 16.

Figure 5:
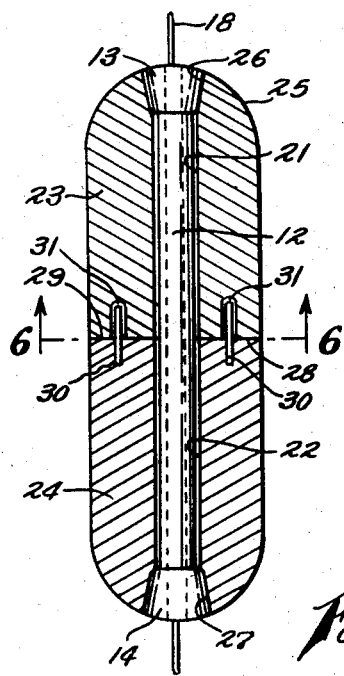
Fig. 5 is a sectional view of a modified form of the invention.
Figure 6:
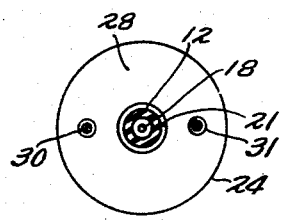
Fig. 6 is a section taken on line 6—6 of Fig. 5.

With reference to Figs. 5 and 6 which illustrate a modification of my invention it will be seen that the tube 12 extends through axially aligned bores 21 and 22 formed in sections 23 and 24, respectively of a float 25. The tube end 13 is disposed in a seat 26 formed in the section 23 and the opposed tube end 14 is located in a seat 27 formed in the section 24, said ends being positioned in their respective seats against rotation by cement, friction, or other means. The sections 23 and 24 have planar engaging faces 28 and 29, respectively, and as shown in Fig. 5 float section 24 has a pair of pins 30 anchored therein and extending from its face 29 into holes 31 formed in the face 32 of float section 23. When it is desired to deform the tube and form line gripping convolutions therein for connecting the float to the line, the sections 23 and 24 are grasped, pulled apart and then relatively rotated until sufficient turns are formed in the tube whereafter the sections are returned to contacting position with the pins 30 engaged in the holes 31 to prevent relative rotation of the sections.

While the foregoing description sets forth the invention in specific terms, it is to be understood that numerous changes may be resorted to without departing from the spirit and scope of the invention as claimed hereinafter.

Having described the invention what is claimed as new is:

1. A connector for an element to be fastened to a line, a body for the element having a hole formed therethrough, a line receiving resilient tube mounted on the body in said hole, means on the ends of the tube cooperative with the body for precluding removal of the tube from the hole, said means being adapted to be rotatably manipulated for twisting the tube in the hole to provide line locking convolutions therein, and means for releasably holding said means against rotation after the tube is in twisted condition in the hole.

2. A connector as set forth in claim 1 wherein the means on the ends of the tube are enlarged portions which seat in opposed countersunk recesses in the body, and wherein one of said ends is fixed in its seat whilst the opposed enlarged portion is releasably held in its seat by inward pressure of said enlarged portion on said seat.

3. A connector as set forth in claim 1 wherein the body is in two sections, each section being in face-to-face engagement in a plane normal to the tube, and wherein the tube ends are fixed to each section and the sections have co-operative pin-and-hole connecting means for precluding relative rotation of the sections after the tube has been placed in twisted condition.

References Cited in the file of this patent

UNITED STATES PATENTS

| | | |
|---|---|---|
| 2,225,472 | Franklin | Dec. 17, 1940 |
| 2,556,932 | Morrissey | June 12, 1951 |
| 2,570,293 | Vadnais | Oct. 9, 1951 |
| 2,787,079 | Wilson | Apr. 2, 1957 |